United States Patent [19]

Rieser et al.

[11] 4,107,366
[45] Aug. 15, 1978

[54] GLASS-PLASTIC LAMINATES

[75] Inventors: Raymond G. Rieser, Lower Burrell; Joseph Chabal, Curtisville, both of Pa.

[73] Assignee: PPG Industries, Inc., Pittsburgh, Pa.

[21] Appl. No.: 438,077

[22] Filed: Jan. 30, 1974

Related U.S. Application Data

[62] Division of Ser. No. 181,137, Sep. 16, 1971, Pat. No. 3,808,077.

[51] Int. Cl.² .................. B32B 7/02; B32B 17/10; B32B 27/00
[52] U.S. Cl. .................. 428/215; 156/303.1; 156/306; 428/421; 428/437
[58] Field of Search .......... 161/189, 199, 204, 165; 428/437, 500, 501, 421, 522, 524, 426, 215, 213

[56] References Cited

U.S. PATENT DOCUMENTS

| 3,282,722 | 11/1966 | Hailstone | 161/199 X |
|---|---|---|---|
| 3,453,161 | 7/1967 | Golightly | 161/199 X |
| 3,505,167 | 4/1970 | Smarook | 161/189 |
| 3,539,412 | 11/1970 | Miller | 161/199 X |
| 3,558,415 | 1/1971 | Rieser et al. | 161/199 X |
| 3,657,057 | 4/1972 | Shorr et al. | 161/199 X |
| 3,658,636 | 4/1972 | Beckmann et al. | 161/199 |
| 3,671,370 | 6/1972 | Littell | 161/199 X |
| 3,781,184 | 12/1973 | Domicone et al. | 161/165 |

FOREIGN PATENT DOCUMENTS 828,381  2/1960  United Kingdom .................. 161/199

Primary Examiner—Lorraine T. Kendell
Attorney, Agent, or Firm—Edward I. Mates

[57] ABSTRACT

A transparent, laminated window having an exposed sheet of plastic material softer than glass adhered to glass, such as a bilayer windshield consisting essentially of an outer glass sheet and an inner preformed sheet of plasticized polyvinyl butyral covered with a thin sheet of polyvinyl fluoride on its exposed surface produced by lamination under heat and pressure with the thin polyvinyl fluoride sheet supported in pressurized engagement against a smooth surface of a mold, which is preferably a second glass sheet having a shape conforming to that of the glass sheet of the resulting laminated window.

5 Claims, 2 Drawing Figures

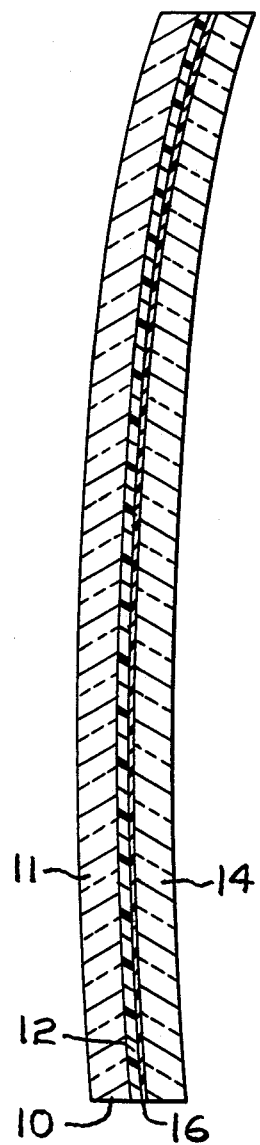
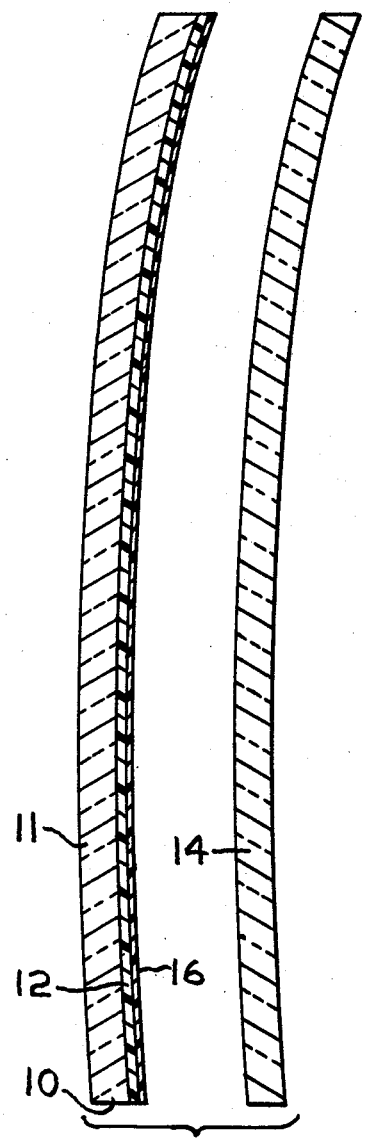

GLASS-PLASTIC LAMINATES

This is a division of application Ser. No. 181,137, filed Sept. 16, 1971, now U.S. Pat. No. 3,808.077.

BACKGROUND OF THE INVENTION

The present invention relates to laminated safety glass which is commonly employed for windshields of an automobile and for other industrial uses. While most commercial present day automobile windshields comprise two sheets of glass and a thermoplastic interlayer, the present invention relates to laminated windows having an exposed layer of plastic resin, particularly "bilayer windshields" consisting essentially of one transparent glass sheet and one transparent sheet of plastic resin, such as polyvinyl butyral resin. The term "bilayer windshields" used throughout this specification is not limited to two layer laminates, but relates to any laminated window including a sheet of glass laminated to a layer of a plastic having a smooth surface (opposite that facing the glass) in pressurized engagement with a laminating mold during lamination. A thin protective coating such as polyvinyl Duoride may be present on the smooth surface. Such "bilayer windshields" may find use as side lights or back lights as well as windshields of automobiles or as closures for other vehicles as well as buildings. The term is also to be interpreted as covering laminated articles in which the glass sheet surface facing away from said plastic resin is in turn laminated to one or more plies of transparent material as in bullet-resisting glass and laminated windows having at least two glass plies alternating with plastic with an anti-lacerative coating of plastic on the glass surface facing the interior of the vehicle, and the like. U.S. Pat. No. 2,047,253 to Brooks suggests that a piece of laminated glass composition of two sheets of glass secured together by a single sheet of plastic material is less resistant to breakage by impact than is a single piece composed of a single layer of glass and a single layer of plastic each the same as where two pieces of glass are used. Falling ball tests show that laminates made with a single layer of glass is at least 50% stronger than laminates having two layers of glass, according to this patent. This improved strengthening of a so-called bilayer windshield is alleged to be due to the fact that there is no shearing effect when only one piece of glass is used while in the standard laminated glass windshield, the plastic tends to be sheared between the fractured layers of glass. Despite this suggestion in the Brooks patent, laminated windshields for automobiles have continued to be fabricated with two sheets of glass and a plastic interlayer. It is suggested that the reason for this lack of change in windshield structure has been due to the lack of a suitable fabrication technique for making bilayer windshields.

U.S. Pat. No. 2,120,628 to Reid claims a bilayer windshield having one glass sheet and one layer of a polyvinyl acetal resin treated in such a manner to produce properties superior for laminates. However, all the Examples receited in this patent refer to producing glass-plastic laminates in which the polyvinyl acetal resin sheet is interposed between a pair of glass sheets. Again, it is suggested that the absence of an Example disclosing how to fabricate a bilayer is due to the absence of knowledge of a suitable fabrication technique.

U.S. Pat. No. 2,184,876 to Sherts suggests laminating a single sheet of plasticized polyvinyl acetal to glass using an outer face of unplasticized resin to protect what whould be an exposed surface of plasticized polyvinyl acetal. A thin flexible sheet plated with chromium is suggested as a parting material over the resin sheet. This patent shows only a flat laminate whose shape can be accommodated by a thin chromium plated flexible sheet. Such a sheet cannot be shaped readily to conform to a concave shape and cannot be formed in a permnent shape except for a flat shape.

Any material used as a parting material or as a mold release agent between the mold and the plastic layer that is even slightly adherent to the plastic layer causes an uneven surface of the plastic sheet when the mold and the removed porting material are from the plastic layer after subjecting an assembly to heat and pressure to laminate the bilayer windshield. Any resulting optical defect annoys the driver and other occupants of the vehicle and is likely to be rejected commercially.

Curved bilayer windshields have an outer ply of glass having a generally convex surface facing the outside of the vehicle to which an inner plastic sheet coextensive throughout the entire extent of the outer glass sheet is laminated. The plastic inner sheet has a generally concave surface facing the interior of the vehicle. The problem of removing a mold from the plastic sheet of the bilayer formed by heat and pressure lamination is further complicated by the fact that the mold surface held in pressurized engagement against the concave surface of the plastic layer of the bilayer windshield so laminated must be convexly curved.

The resulting laminated bilayer windshield thus tends to wrap itself about the mold, making separating the mold from the bilayer windshield further complicated. The resulting transparent laminated window must have a relatively soft plastic inner sheet presenting a smooth, concave surface facing the interior of the vehicle that is free of optical defects laminated to at least one glass sheet that is harder that the inner plastic sheet. The relatively soft, plastic inner layer causes the resulting laminate to exhibit a lower Severity Index and less lacerative damage than a more conventional laminated glass windshield having an innermost glass ply.

SUMMARY OF THE INVENTION

The present invention suggests a bilayer windshield assembling a preformed plastic sheet of approximately uniform thickness between a preformed glass sheet that serves as a mold and a preformed glass sheet that becomes part of the bilayer windshield. The glass sheet that serves as a mold preferably has the same physical properties such as Young's modulus, hardness and thermal expansion coefficient as that of the glass sheet to be laminated to the preformed plastic sheet to avoid localized distortion of the interposed plastic sheet during the heating and pressure application steps associated with lamination. In addition, the glass sheet that serves as a mold provides a smooth rigid surface having a shape conforming to that of the glass sheet to be laminated. Hence, there is uniform pressure applied to the preformed plastic sheet while the latter is pressed against the glass sheet to be laminated. These features enables the plastic sheet to retain its uniform thickness characteristic after the laminating cycle of pressure and temperature is completed. The mold is of a material that is more rigid than that of the preformed plastic sheet throughout the temperature range presently experienced during laminating.

Preferably, the glass sheet forming the mold has a shape conforming to that of the glass sheet to which the preformed plastic sheet is to be laminated and approximately the same thickness as that of the glass sheet to be laminated so that as the temperature and pressure applied through the glass sheets against the opposite surfaces of the plastic sheet varies during the laminating cycle, the effect on the plastic sheet is approximately uniform throughout the extent of the plastic. Any parting material between the mold and the preformed plastic sheet is less than 0.005 inch thick and preferably approximately 0.002 inch or less to minimize any effect that causes a non-uniform temperature or pressure from surface to surface of the plastic sheet during lamination.

According to this invention, a parting material is selected that adheres to the plastic sheet but not to glass. This is helpful in protecting a laminated windshield having a plastic layer of polyvinyl butyral exposed to the pressure of the mold.

DETAILED DESCRIPTION OF THE INVENTION

The transparent plastic material of the plastic ply of the "bilayer windshield" and the like is a polyvinyl acetal such as plasticized polyvinyl butyral resin coated with a thin film of protective material such as polyvinyl fluoride. Plasticized polyvinyl acetal resins have the required transparency, tensile strength and flexibility also found in polyurethane resins. polyvinyl butyral is prepared as recited in U.S. Pat. No. 2,400,957 to Stamatoff, and is commonly used as the interlayer of laminated glass windshields because of its adhesion to glass when subjected to suitable temperatures and pressure, because it is transparent when bonded between two sheets of glass and because of its resistance to elongation whenever an object impacts upon a laminated safety glass window such as the multilayer safety glass laminate described herein.

The polyvinyl acetal resins may be made from various unsubstituted aldehydes or mixtures thereof or even from unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be used. In general, the acetal resin is made by reacting an aldehyde with hydrolyzed polyvinyl ester in the presence of a solvent with a product and precipitating the resin product with water. Alternate methods might include carrying out the reaction in the presence of a non-solvent dispersing medium such as water or a non-solvent mixture of water and solvent, for example, a water-ethanol mixture. In general, polyvinyl acetal resins made from saturated or unsubstituted aliphatic aldehydes are the most suitable. These would include polyvinyl acetal resins made from unsubstituted saturated aliphatic aldehydes containing less than six carbon atoms and especially those made from formaldehyde, acetaldehyde, butyraldehyde, and mixtures thereof. Particularly preferred are polyvinyl acetal resins made from butyraldehyde, the so-called polyvinyl butyral, the preferred molecular weight range is from 150,000 to 250,000. The polyvinyl acetal resins may be considered to be made up on a weight basis of from 5 to 25 percent hydroxyl groups, calculated as polyvinyl alcohol, 0 to 40 percent acetate groups, calculated as polyvinyl acetate and the balance being essentially acetal. When the acetal is butyraldehyde acetal, the polyvinyl acetal resin will preferably contain on a weight basis, from 16 to 25 percent hydroxyl groups calculated as polyvinyl alcohol and from 0 to 10 percent acetate groups calculated as polyvinyl acetate, the balance being essentially butyraldehyde acetal. Polyvinyl acetal resins, particularly polyvinyl butyral, are well known in the art as efficient innerlayers for laminated safety glass windshields. Therefore, further description of the polyvinyl acetal resins is not necessary, as those skilled in the art are well aware of these materials and their methods of preparation. More details on the preparation of polyvinyl acetal resins are found in U.S. Pats. Nos. Re 20,430 and 2,496,480.

Conventionally, polyvinyl acetals, particularly polyvinyl butyral as used in safety-glass laminates, contains a plasticizer. Generally, the plasticizer used is a water-insoluble ester of a polybasic acid and a polyhydric alcohol. Particularly desirable plasticizers for use in the present invention are triethylene glycol di(2-ethyl butyrate), dibutyl sebacate, di(beta-butoxy-ethyl) sebacate and dioctyl phthalate.

Various plasticized polyvinyl acetal resins are described in detail in U.S. Pat. No. 2,372,522.

Many well-known plasticizers suitable for use with polyvinyl butyral are disclosed in U.S. Pat. No. 2,526,728 to Burk et al. The most commonly used are monocarboxylic aliphatic acid esters of ether glycols, such as triethylene glycol di-2 ethyl butyrate.

Generally, the plasticizers used are water-insoluble esters of a polybasic acid or a polyhydric alcohol. Particularly desirable plasticizers for use in the present invention are triethylene glycol di(2-ethyl-butyrate), dibutyl sebacate, di(beta-butoxy-ethyl) adipate, and dioctyl phthalate. Other suitable plasticizers include triethylene glycol fully esterified with a mixture of 80-90 per cent caprylic acid and 10-20 per cent capric acid as described in U.S. Pat. No. 2,372,522, dimethyl phthalate, dibutyl phthalate, di(butoxyethyl) sebacate, methyl palmitate, methoxyethyl palmitate, triethylene glycol dibutyrate, triethylene glycol diacetate, tricresyl phosphate, triethyl citrate, butyl butyryl lactate, ethyl para-toluene sulfonamide, dibutyl sulfone, lauryl alcohol, olely alcohol, glycerol triricinoleate, methyl lauroyl glycolate, butyl octanoyl glycolate and butyl laurate. The above list of plasticizers does not represent all the known plasticizers which can be used. Such a list would be impractical and would serve no purpose since one skilled in the art can readily select a plasticizer from the many already known.

It should be mentioned that although the polyvinyl acetal resins can be used in the practice of this invention certain precautions should be taken when using these inner-layer materials. The materials are particularly susceptible to moisture and if care is not taken, the moisture will permeate the polyvinyl acetal innerlayer and weaken the bond between the innerlayer and the outer glass ply. To prevent this, a thin, protective moisture-resistant coating can be imposed on the exposed surface of the polyvinyl acetal sheet.

The exposed surface of the polyvinyl acetal innerlayer could be protectively coated with a thin film of material, such as polyvinyl fluoride compositions available commercially under the trademark of TEDLAR by E. I. du Pont de Nemours and Company of Wilmington, Delaware.

Glass Compositions Suitable for Fabricationg Bilayer Windshields

Any well known commercial plate, float or sheet glass composition or any other transparent glass generally used in windows is suitable for use as the outer glass sheet of a bilayer windshield. Particularly suitable compositions are those of the soda-lime-silica type which may include or exclude a glass tinting composition such as about ½ per cent of iron oxide. The glass sheet is preferably between about 0.01 and 0.13 inch thick.

Preferably, the present invention relates to the formation of bilayer windshields whose outer ply is a commercial soda-lime-silica glass such as glasses having the following composition:

|  | Percent by weight |
|---|---|
| $Na_2O$ | 10–15 |
| $K_2O$ | 0–5 |
| CaO | 5–15 |
| $SiO_2$ | 65–75 |
| MgO | 0–10 |
| $B_2O_3$ | 0–5 |

A typical soda-lime-silica glass suitable for use in accordance with this invention has the following composition:

|  | Percent by weight |
|---|---|
| SiO | 71.38 (usual variation 71 to 74%) |
| $Na_2O$ | 12.76 (usual variation 12 to 14%) |
| $K_2O$ | 0.03 (usual variation 0 to 1%) |
| CaO | 9.67 (usual variation 8 to 12%) |
| MgO | 4.33 (usual variation 2 to 5%) |
| $Na_2SO$ | 0.75 (usual variation 0.1 to 1.0%) |
| $Fe_2O_3$ | 0.15 (usual variation 0.1 to 1.0%) |
| $Al_2O_3$ | 0.81 (usual variation 0.1 to 1.0%) |

A similar glass sheet may be used as a mold during lamination of the bilayer windshield.

If desired, the mold may be chemically tempered by ion exchange at an elevated temperature below the strain point as taught in U.S. Pat. No. 3,477,834 to John W. Morris after grooving its margin and before applying a special release coating to its surface. A typical chemical tempering operation involves immersing the mold in a potassium nitrate bath for 6 hours at 900° F. This temperature strengthens the glass mold without distorting its shape and enables the mold to be reused in the fabrication of many bilayer windshields.

III. Parting Material Compositions

The composition used as a parting material between the mold and the preformed plastic sheet may be any material that is sufficiently thin (less than 5 mils thick) to avoid establishing an arrangement through the thickness of the glass sheet to be laminated, the preformed plastic sheet to be laminated, the parting material and the glass sheet that serves as a removable mold during the lamination operation that does not depart significantly from symmetry through the thickness of these elements of the assembly. Limiting the asymmetry of the arrangement limits any unbalanced force applied against the opposite surfaces of the preformed plastic sheet that would cause deviations in plastic sheet thickness sufficient to impart optical distortions in the plastic sheet and hence, to the laminate.

The parting material must be smoothly surfaced, and may consist essentially of a film of material, such as polyvinyl fluoride compositions available commercially under the tradename of TEDLAR by E. I. du Pont de Nemours and Company of Wilmington, Delaware and described in U.S. Pat. No. 3,451,978.

Since present day windshields are curved, and glass requires a higher temperature for shaping than is required to laminate glass to plastic, a glass sheet to be the outer ply of a bilayer windshield is usually shaped with one or more glass sheets, one of which becomes a mold that may be reusable in the fabrication of other bilayer windshields. A typical technique for bending glass sheets in multiples by a gravity sagging method near the glass softening point is described in U.S. Pat. No. 3,453,161 to J. S. Golightly. It is also understood that the gravity sag technique may also be employed to bend a single pair of glass sheets or even one glass sheet at a time, if desired.

As an alternate method for shaping the glass sheets to the shape desired for the laminated windshield by the gravity sagging techniques described hereinabove, it is also contemplated to form the individual glass sheets to their desired shape by press bending, then chemically tempering one of the sheets prior to laminating as described and claimed in British Pat. No. 1,202,187 to John Comperatore. The chemically tempered sheet becomes a reusable mold and is preferably chemically tempered by ion exchange at a temperature below the strain point of the glass so that the glass mold retains its shape conforming to that of the glass sheet to be laminated during the chemical tempering. The term "press bending" as contemplated herein may be accomplished by supporting the glass vertically as in U.S. Pat. No. 3,367,764 to Samuel L. Seymour or supporting the glass horizontally as in U.S. Pat. No. 3,374,077 to James H. Cypher and may also include a vacuum assist as depicted in U.S. Pat. No. 3,468,645 to Harold A. McMaster.

Fabrication of Bilayer Windshields

The desired preformed plies of glass and plastic to form the bilayer windshield are assembled in face to face relation. A second glass sheet, that is used as a mold is assembled with a thin film of parting material facing the other surface of the preformed plastic sheet. Air entrapped between the plies can be removed by placing the assembly in a thin, flexible bag and pulling a partial vacuum. The bag is sealed and lamination completed under pressure by subjecting the assembly to the polyurethane softening temperature. The sealing can be accomplished in from between about 5 and about 10 minutes at a temperature of 300° F. and a pressure of 10–25 pounds per square inch above atmospheric. The laminate can then be placed in an oil or an air autoclave until the laminate is sealed at a temperature of between about 200° and 350° F. for a period between about 45 minutes and 2 hours at a pressure of 50 to 250 pounds per square inch. The autoclave conditions, however, will depend upon the particular polymers employed.

The assembly is cooled, then the pressure reduced and the mold is separated from the rest of the assembly.

DESCRIPTION OF THE PREFERRED EMBODIMENT

According to a preferred embodiment of the present invention two sheets of glass of matched outline are bent simultaneously by heating to their deformation temperature while supported in bending relation to a bending mold, such as one depicted in U.S. Pat. No.

2,933,856 to W. W. Barcikowski et al. or U.S. Pat. No. 2,794,300 to J. S. Golightly. A layer of a suitable parting material, such as an aqueous dispersion of a diatomaceous earth as described in U.S. Pat. No. 2,725,320 to F. V. Atheson et al., is applied between the interfacial surfaces of the two glass sheets to prevent the sheets from adhering to one another during their heating incidental to shaping.

After the glass sheets are bent to conform to the shape of the shaping mold, they are separated from one another and the parting material removed by thoroughly washing the sheets. The shaped glass sheets composed of float glass ⅛-inch thick are now separated and one of them is used as a mold and the other as the outer glass ply of a bilayer windshield.

EXAMPLE A

A number of bilayer windshields consisting of an outer ply of curved glass and an inner ply of plasticized polyvinyl butyral were made by assembling the plies of the bilayer windshield is aligned relation to form a windshield using the following procedure.

For each assembly fabricated, a bend sheet of float glass approximately ⅛ inch thick preshaped to conform to the windshield curvature desired was selected and arranged with its concavely curved surface facing a preformed sheet of commercial plasticized polyvinyl butyral resin having a thickness of 30 mils, 45 mils or 60 mils applied to the concave surface of the float glass sheet. A thin sheet of polyvinyl fluoride having a thickness of approximately 1 to 2 mils was applied to the exposed surface of the plasticized polyvinyl butyral sheet and smoothed. Then, a second sheet of float glass ⅛-inch thick shaped to conform to the shape of the first sheet of float glass was applied to the sheet of polyvinyl fluoride in alignment with the other components of the assembly. The assembly components were taped together and the taped assembly was wrapped in plastic to maintain the alignment of its components and the resulting assembly inserted within a laminated bag of the type disclosed in U.S. Pat. No. 3,311,517 to Leroy D. Keslar and John Rankin. The bag comprised an outer ply of polyethylene glycol terephthalate commonly available under the trademark of Mylar and an inner ply of polyethylene bonded to the Mylar. The bag had a total thickness not exceeding 5 mils. The bag with the assembly inside was evacuated at a vacuum of about 25 inches of mercury and the evacuated bag sealed. The sealed unit was placed in an oil autoclave and subjected to a pressure of 200 pounds per square inch at a temperature of 275° F. for 45 minutes. Each unit so treated was cooled in the autoclave with the elevated pressure maintained until the temprature was reduced to approximately 150° F. The pressure was then reduced, and the units removed from the autoclave.

The bags and plastic wrappings were removed from the assemblies. The second glass sheet of each assembly was separated from the polyvinyl fluoride film which remained adhered to the polyvinyl butyral. The resulting laminates had a smoothly surfaced polyvinyl butyral sheet of concave configuration covered by the thin polyvinyl fluoride film on one side and a curved glass sheet having a convex configuration facing the other side.

Impact tests have been developed using a so-called Alderson dummy that impacts a test windshield at a preselected velocity using a sled test facility of the type described in "Eleventh STAPP Car Crash Conference" proceedings page 143 published by the Society of Automotive Engineers, New York, in 1967. A means of determing soft-tissue injury, and particularly, minor soft-tissue injury, has been achieved by covering the head of the Alderson dummy with two layers of a chamois to simulate human skin. Surface lacerations in the form of shallow scratches to the outer layer only are classed as "minor" and given a Lacerative Injury Rating of 1, whereas extensive cuts and gouges through both layers of the chamois are considered as "serious" and given a Lacerative Injury rating of 5, with intermediate degrees of damage to the chamois rated 2, 3 or 4, depending on the severity of damage to the chamois. For example, dummies whose chamois have a few shallow cuts to the outer layer only are given a Lacerative Injury Rating of 2 if the inner chamois layer is undamaged, if there are more extensive cuts and gouges to the outer layer only, the Lacerative Injury Rating is 3, and if there are many cuts and gouges with a few extending through both layers of the chamois, the Lacerative Injury Rating is 4.

The Example compositions meet the minimum light transmittance and haze requirements of the automobile code (ANSI Code Z-26.11966 Test No. 18).

TEST RESULTS

At 25 miles per hour impact, conventional trilayer windshields with two ⅛-inch thick float glass sheets and a 30 mil thick plasticized polyvinyl butyral interlayer had an average Lacerative Injury rating of 3.2. By comparison, the following table shows that all the bilayer windshields but one of those tested had a Lacerative Injury Rating of 1 at impact velocities as high as 31.8 miles per hour.

TABLE

COMPARISON OF LACERATIVE INJURY RATING

| Windshield Configuration | Impact Velocity (Miles per Hour) | Plastic Thickness (MILS) | Rating |
|---|---|---|---|
| F - V - F | 25 (ave.) | 30 | 3.2 (ave.) |
| P - F | 30.5 | 30 | 1 |
|  | 30.6 | 30 | 1 |
|  | 30.7 | 30 | 1 |
|  | 26.4 | 30 | 1 |
| V - F | 24.1 | 60 | 1 |
|  | 30.3 | 60 | 1 |
|  | 23.8 | 60 | 1 |
| V - F | 21.1 | 45 | 1 |
|  | 26.1 | 45 | 1 |
|  | 31.3 | 45 | 1 |
| V - F | 25.3 | 30 | 1 |
|  | 28.5 | 30 | 1 |
|  | 30.3 | 30 | 1 |
|  | 30.5 | 30 | 1 |
|  | 31.8 | 30 | 1 |
|  | 24.4 | 30 | 1 |
|  | 24.7 | 30 | 1 |
|  | 25.4 | 30 | 1 |
|  | 22.2 | 30 | 1 |
|  | 24.8 | 30 | 2 |

(F is 1/8 inch thick float glass; V is plasticized polyvinyl butyral).

BRIEF DESCRIPTION OF THE DRAWINGS

In the drawings which form part of a description of the present invention,

FIG. 1 is a sectional view of an assembly of a mold, a preformed plastic sheet to be formed into the inner ply of a bilayer windshield and a glass sheet to be formed into the outer ply of a bilayer windshield showing how the parting material is arranged with the assembly; and FIG. 2 is an exploded cross-sectional view similar to FIG. 1, showing one embodiment of the present invention, particularly effective when the preformed plastic sheet is polyvinyl butyral.

Referring to the drawings, FIG. 1 shows an assembly of a glass sheet 10 having an outward facing convex surface 11 is shown with its inner concave surface facing a preformed plastic sheet 12. A mold 14, preferably of chemically tempered glass and matching in curvature to that of the glass sheet 10 is assembled on the opposite side of the sheet 12 with a suitable release agent 16 interposed between the mold 14 and the preformed plastic sheet 12. In FIG. 2, the parting material 16 is a thin film about 1 mil thick of a polyvinyl fluoride composition such as sold under the trademark of TEDLAR. As shown in FIG. 2, when the mold 14 is removed from the laminated assembly, the parting material 16 remains adhered to the plastic inner layer 12 of the bilayer windshield. When the inner layer 12 is plasticized polyvinyl butyral, it is important that it be protected from direct exposure to moisture and the parting material of this embodiment may serve a dual purpose, first as a parting material during lamination, and a protective coat after lamination.

In order to insure that the protective coating 16 of the FIG. 2 embodiment has smooth, unwrinkled surfaces, it is press polished at a temperature approaching the softening point of the plastic under high pressure, such as above 100° to 200° F., depending on the material used as at a pressure of at least 100 pounds per square inch, before its assembly with the mold and the elements of the bilayer windshield. The preformed plastic sheet 12 has smooth surfaces when assembled. However, the pressure applied by the glass sheet mold 14 on one side and the curved glass sheet 10 that forms part of the bilayer windshield on the other side of the plastic sheet 12 insures the maintenance of smooth surfaces.

When bilayer windshields are fabricated using a preformed plastic sheet as part of the assembly to be laminated to one glass sheet, the plastic surface that becomes an exposed surface of the bilayer windshield develops a surface that reproduces the mold surface. Even when a suitable parting material is provided between the mold and the ultimately exposed plastic surface, the intimate contact between the parting material applied to the mold and the plastic sheet necessitates that the separation start at the peripheral edge and be propagated toward the interior of the assembly. How the separation is initiated is crucial to the successful separation of the mold from the bilayer windshield without marring the optical properties in the vision area. Starting the separation at the marginal peripheral portion of the assembly may harm the smooth surface of the plastic sheet in the peripheral portion. However, if due care is taken, and if any damage from the separation is limited to the marginal area that is hidden after installation in a vehicle frame, this damage is localized and does not extend into the vision area of the bilayer windshield.

The specific embodiment of the mold described hereinabove relates to a flexible glass sheet preferably having a thickness between about 50 and 250 mils, and preferably glass that has been chemically tempered to improve its resistance to fracture.

Chemically tempering the glass sheet forming the mold 14 gives it greater flexibility and greater resistance to breakage so that it may be reused many times.

It is readily understood that, material other than glass may be used for the mold. It is also understood, however, that if the mold is composed of a material other than glass, it must have a thermal expansion coefficient compatible with glass so that localized portions do not expand or contract at a rate significantly different from that of glass. If this criterion is not followed, the preformed plastic sheet becomes compressed in different amounts in different regions so that the plastic sheet develops optical distortion.

It is also understood that while the technique described hereinabove is especially suitable for fabricating bilayer windshields for automobiles, it is equally well suited for use in laminating multiply laminates having one or more layers of transparent material laminated to the surface of the glass sheet facing away from the preformed plastic sheet in the laminated windshield, such as a more conventional automobile windshield comprising two glass sheets adhered together by a thermoplastic interlayer with an innermost layer of plastic.

It is understood that a suitable adhesive may be provided at any interfacial surface between plastic and glass in either the bilayer or multilayer windshields provided above.

It is further understood that while the bilayer windshields contemplated to be fabricated consist essentially of an outer ply of glass and an inner ply of plasticized polyvinyl butyral, other rigid transparent materials such as a plurality of glass and/or rigid transparent plastic, such as polycarbonates and acrylics, may form a single layer or multiply outer portion of the laminate and the mold facing layer of the laminate may be any yieldable plastic material that is preferably thermoplastic that would adhere to the mold except for the provision of a suitable parting material.

When assembling preformed plastic sheets, it is desirable to have the preformed plastic sheets of as nearly uniform thickness as possible, no more than 5 mils and preferably less than 1 mil difference between the thickest and thinnest portions. Too great a disparity in thickness causes optical distortion.

The mold thickness determines how flexible it is. A glass sheet used as a mold should have a thickness between approximately 50 and 250 mils. Thicker glass sheet molds are too inflexible for ready removal from a plastic surface and thinner glass sheet molds are difficult to handle without danger of breakage.

It is understood that the superior results described hereinabove result from the combined contribution of several factors. First, the uniform thickness of the preformed plastic sheet provides an easy method to assemble the glass sheet to be laminated and the mold in uniformly spaced relation from one another initially. Also, the selection of a mold having a shape conforming to that of the glass sheet to be laminated together with physical properties matching those of the glass sheet such as coefficient of thermal expansion, Young's modulus, hardness, etc. over the range of temperatures normally experienced during lamination and, preferably, one as nearly identical as possible as the curved glass sheet to be laminated, reduces the chance of shape distortion that could be imposed on the preformed plastic sheet during lamination if these criteria are not followed.

While glass has been suggested as the preferred composition for the laminating mold, it is understood that the mold may be composed of any material more rigid in its thickness than the plastic at laminating temperatures that has a smooth surface that can be flexed at room temperature such as metals, alloys and other materials that have physical properties compatible with that of glass throughout the laminating temperature range and that can be shaped to a rigid shape conforming to the shape required for the smooth surface of the plastic layer of the "bilayer windshield" and the like.

Typical bilayer windshields for automobiles produced by the teachings of this invention comprise an outer glass sheet 50 to 250 mils thick, typically approximately 65 to 125 mils thick and an inner ply of plasticized polyvinyl butyral 1 to 100 mils thick, typically ranging from approximately 30 to 60 mils thick in turn covered with a film of polyvinyl fluoride approximately 1 to 2 mils thick. The surface facing the interior of the vehicle is optically smooth in its vision area and is self healing when scratched.

The form of the invention subject matter described in this disclosure represents illustrative preferred embodiments thereof. It is understood that various changes may be made without departing from the spirit of the invention as defined in the claimed subject matter which follows:

We claim:

1. A curved laminated window comprising an outer sheet of curved glass, an inner layer of polyvinyl butyral bonded on one side to said sheet of curved glass and a layer of polyvinyl fluoride bonded to said sheet of polyvinyl butyral on the side opposite to the side bonded to said outer sheet of curved glass.

2. A laminated window as in claim 2, wherein said outer sheet of glass has a thickness between 50 and 250 mils, said polyvinyl butyral layer has a thickness of 30 to 60 mils and said polyvinyl fluoride layer has a thickness of approximately 1 to 2 mils.

3. A laminated window as in claim 2, wherein said outer glass sheet has a thickness of approximately $\frac{1}{8}$ inch.

4. A laminated window as in claim 1, wherein said outer glass sheet has an outer convex surface facing away from said layer of polyvinyl butyral and said layer of polyvinyl fluoride has an outer concave surface facing away from said layer of polyvinyl butyral.

5. A laminate comprising a glass outer layer having a thickness in the range of about 0.050–0.250 inches, a polyvinyl butyral inner layer bonded to said glass layer, having a thickness in the range of about 0.030–0.060 inches, and an inner film of polyvinyl fluoride bonded to said polyvinyl butyral inner layer, having a thickness in the range of about 0.001–0.002 inches.

* * * * *